May 12, 1936.  J. KIRSTEIN  2,040,656
SPRING CONSTRUCTION
Filed Nov. 6, 1934
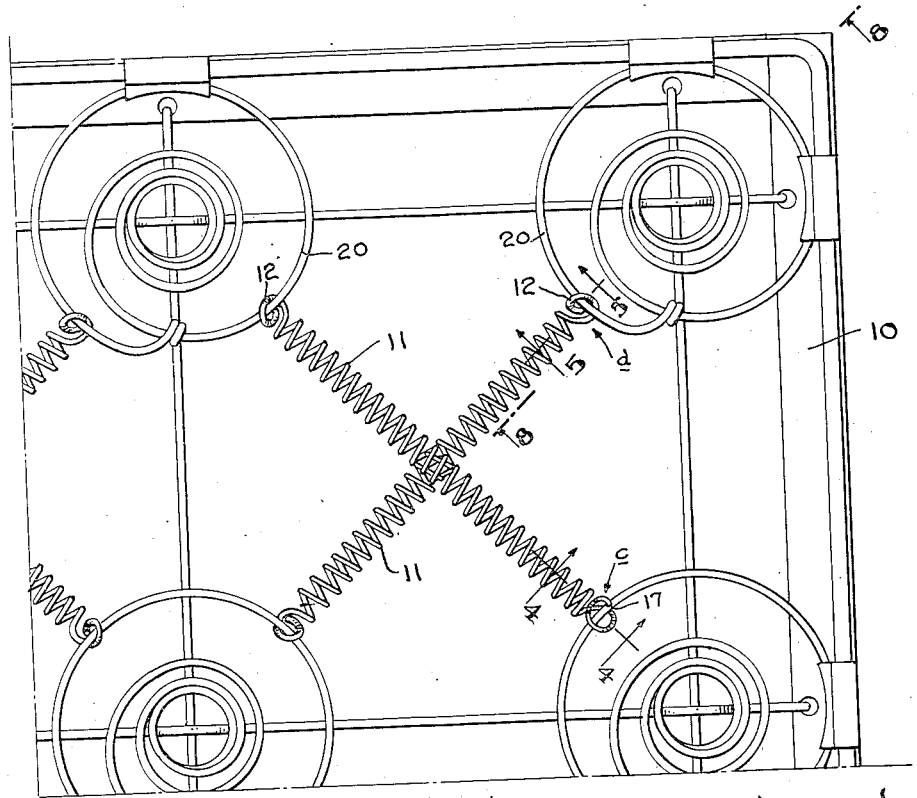
Fig. 1.
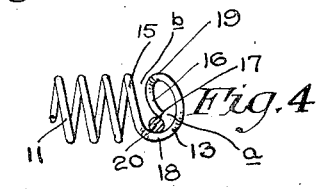
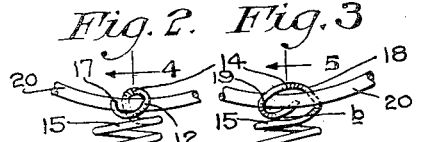
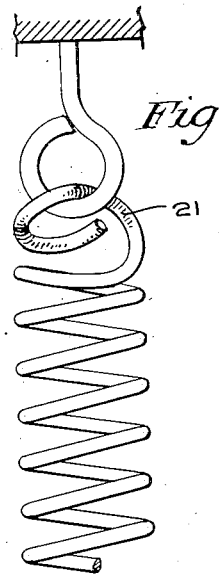
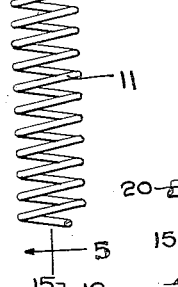
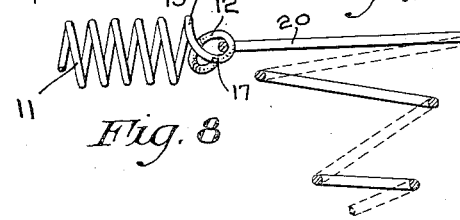
Inventor
JACOB KIRSTEIN
By Leo Edelson
Attorney.

Patented May 12, 1936

2,040,656

UNITED STATES PATENT OFFICE 2,040,656

SPRING CONSTRUCTION

Jacob Kirstein, Philadelphia, Pa., assignor to Bunting Glider Company, Philadelphia, Pa., a corporation of Pennsylvania Application November 6, 1934, Serial No. 751,681

5 Claims. (Cl. 5—269)

This invention relates to coil springs and more particularly to improvements in the design and construction of the anchoring extermities thereof.

Among the principal objects of the present invention is the provision of means formed in the anchoring extremity of a coil spring for effectually precluding the unintentional disconnection of the spring from the structure to which it is attached, this means being in the form of what may be termed a "double-lock" connecting loop.

Another object of the invention is the provision in a coil spring of an anchoring extremity in the form of a loop of such shape that when properly attached to a supporting structure the loop functions to very materially limit the angular displacement of the coil spring about its axis, thus insuring a relatively fixed position of the spring with respect to its supporting structure, this being a condition which is much to be desired because when the permissible angular displacement of the spring is relatively unlimited the possibility of the spring end becoming disengaged from the structure to which it is attached is greatly increased.

Still another object of the present invention is the provision of an anchoring loop at one or both extremities of a coil spring of such character that the terminal end of the spring wire is disposed within the circumference of the coil, thus insuring against the presence of any sharp points which might engage and so damage tearable material which may be in immediate proximity to the coil spring, as when such coil springs are utilized for interconnecting the spiral springs of a fabric-covered spring foundation unit commonly employed in beds, swings, couches and seats generally.

Other objects and advantages of the invention will be apparent from the detailed description which follows:

The invention consists substantially in the combination, construction, location and relative arrangement of parts, all as described more fully hereinafter, as shown in the accompanying drawing and as finally pointed out in the appended claims. In the said accompanying drawing only two general applications are illustrated of the coil spring as constructed in accordance with the present invention, it being understood, of course, that such coil springs are not limited to these illustrated applications but instead may be employed generally in all cases where coil springs are utilized to interconnect adjoining parts or to support one part in suspended relation to another.

In the said accompanying drawing:—

Figure 1 is a plan view of a portion of a spring foundation unit in which the coil springs of the present invention are employed as the connectors between the spiral springs;

Figure 2 is a view showing the first position of the anchoring extremity of the coil spring with respect to the supporting structure for the spring;

Figure 3 is a view showing the second and final position of the anchoring extremity with respect to said structure;

Figure 4 is a view taken on the line 4—4 of Figures 1 and 2;

Figure 5 is a view taken on the line 5—5 of Figures 1 and 3;

Figures 6 and 7 are end views respectively of the connecting positions shown in Figures 2 and 3;

Figure 8 is a vertical sectional view taken on the line 8—8 of Figure 1; and

Figure 9 is a view showing the adaptability of the coil spring of the present invention to another use than that illustrated in Figure 1.

Referring now to the drawing and more particularly to Figures 1 to 7 thereof, it will be observed that for purposes of illustration coil springs as constructed in accordance with the present invention are shown employed as connectors between the spiral springs of a spring foundation unit 10 such as is commonly employed in beds, swings, couches and seats generally. The coil springs, which are designated generally by the reference numeral 11, are each characterized by the provision at each end thereof of an anchoring device 12 substantially in the form of the figure 8 when viewed axially of the spring, this configuration of the anchoring extremity being best shown in Figures 6 and 7 of the drawing.

The anchoring extremity 12 is, of course, formed as an integral part of the coil spring 11, and as a matter of fact is obtained by so distorting the end convolution of the coil spring as to provide a looped section 13 the bight 14 of which lies substantially in the axis of the coil spring, this bight 14 being further spaced outwardly from the plane of the endmost regular convolution 15. The terminal end section 16 of the looped section 13 is turned inwardly of the circumference of the coil spring and thence outwardly of the coil spring substantially in the direction of its axis, in consequence of which the terminal end 17 of the loop is located at a point disposed within the circumference of the coil spring and between the plane of the endmost convolution 15 and the aforesaid bight 14.

Actually, by constructing the anchoring extremity in the manner just described and as shown in the accompanying drawing, there is produced a double-looped anchoring extremity wherein, in addition to the bight 14, there are the bights 18 and 19, as shown more clearly in Figures 6 and 7, each of these latter bights being a part of a separate loop. At this point attention is directed to this important feature of the construction, namely, that the terminal end 17 of the double-loop is spaced from the bight 18 (see space a in Figures 7 and 8) a distance substantially equal to the space b between the bight 19 and the aforesaid endmost convolution 15 of the coil spring.

Preferably, the distances a and b are each less than the overall dimension of the member to which the end of the coil spring is to be secured. In other words, in the case of the arrangement shown in Figure 1, the diameter of the wire 20 forming the spiral springs of the spring foundation unit 10 is greater than either of the spaces a and b aforesaid, in consequence of which the double-looped anchoring extremity of the coil spring must be sprung over the supporting wire of the spiral spring at two successive points before it is properly secured in position.

To anchor the extremity of the coil spring in position upon the spiral spring, the wire 20 forming the latter is first passed through the space b provided between the bight 19 and the endmost regular convolution 15 of the coil spring, the relative arrangement of the parts being then as shown in Figures 2, 4, and 6 and as at c in Figure 1. Thereafter, the coil spring is twisted through approximately a ninety degree angle and the wire 20 forming the spiral spring is then passed through the space a provided between the terminal end 17 of the anchoring loop and the bight 18 thereof; the relative arrangement of the wire 20 and the anchoring loop being then as shown in Figures 3, 5, 7, and 8 and at d in Figure 1. It will be observed that in its final position, the wire 20 constituting the support commonly projects through both loops of the anchoring extremity, the arrangement being such that the bights 18 and 19 of the two loops respectively limit the degree of permissible angular displacement of the coil spring relatively to its supporting member, for example, the wire 20 of Figures 1 et seq. Moreover, it will be observed the terminal end 17 of the anchoring loop is so disposed interiorly of the circumference of the coil spring, that all danger of its engaging and so damaging tearable material which may be employed to cover the foundation unit or which may be in the immediate proximity of the coil spring extremity is substantially eliminated.

The coil spring of the present invention is, of course, adapted to a wide application and is not at all confined to the use illustrated in Figure 1. Thus, it may be employed as in Figure 9 as a spring support for various devices, the double-loop anchoring extremity 21 thereof functioning exactly as described above to provide a double lock against the accidental displacement of the spring from its support. The invention is, of course, susceptible of various changes and modifications without departing from the real spirit or general principles thereof and it is intended therefore to claim the same broadly, as well as specifically, as indicated in the appended claims.

What is claimed as new and useful is:—

1. A coil spring of the character described wherein the endmost convolution is deformed from its normal shape to provide a reversely bent portion terminating in an open loop lying in a plane inclined with respect to the coil axis, the free terminal end of said loop being spaced from the bight of said reversely bent portion a distance substantially equal to that intervening between the bight of said open loop and the endmost normal convolution of the coil spring.

2. A coil spring of the character described having an anchoring extremity in at least one end thereof in the form of an integral continuation of the wire forming the normal convolutions of the spring, said wire continuation including a portion bent outwardly from the adjoining end convolution, thence diametrically across the said end convolution, thence inwardly toward the end convolution, and thence interiorly of the coil circumference to a point disposed within and spaced from said circumference.

3. A coil spring having an anchoring extremity in the form of an integral continuation of the wire forming the normal convolutions of the spring, said wire continuation including a reversely bent part disposed in a plane inclined with respect to the coil axis and a hook-shaped part disposed in a plane oppositely inclined with respect to said coil axis, the free terminal end of said hook-shaped part being disposed interiorly of the circumference of the coil spring.

4. A coil spring of the character defined in claim 3 wherein the said reversely bent part and the hook-shaped part are joined together at a point spaced outwardly from the endmost normal convolution of the spring and located substantially in the locus of the coil axis.

5. A coil spring of the character described wherein at least one extremity thereof is provided with a pair of loops formed in continuation of one another and with the bights thereof respectively arranged substantially at diametrically opposed points in the coil circumference, the said loops being disposed in planes inclined with respect to each other and being joined together substantially in the locus of said coil axis, the common branch of the joined loops being outwardly humped substantially at the locus of the coil axis to provide a third bight projecting axially outwardly of the coil spring, the first of said loops having a free terminal end terminating short of and in spaced relation to the bight of the second of said loops to afford an entrance to said first loop, and the bight of the said first loop being correspondingly spaced from the endmost normal convolution of the coil spring to afford an entrance to the second of said loops.

JACOB KIRSTEIN.